(12) United States Patent
Huang et al.

(10) Patent No.: US 11,523,328 B2
(45) Date of Patent: Dec. 6, 2022

(54) INFORMATION ENCODING METHOD AND DEVICE FOR MASTER INFORMATION BLOCK ENCODING

(71) Applicant: Huawei Technologies Co., Ltd., Shenzhen (CN)

(72) Inventors: Lingchen Huang, Hangzhou (CN); Yunfei Qiao, Hangzhou (CN); Rong Li, Hangzhou (CN); Guijie Wang, Hangzhou (CN); Shengchen Dai, Hangzhou (CN); Zukang Shen, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/523,684

(22) Filed: Jul. 26, 2019

(65) Prior Publication Data

US 2019/0349839 A1    Nov. 14, 2019

Related U.S. Application Data

(63) Continuation of application No. PCT/CN2018/073404, filed on Jan. 19, 2018.

(30) Foreign Application Priority Data

Jan. 26, 2017    (CN) .......................... 201710057559.1

(51) Int. Cl.
*H04W 48/08*     (2009.01)
*H04L 5/00*      (2006.01)
*H04W 72/04*     (2009.01)

(52) U.S. Cl.
CPC ........... *H04W 48/08* (2013.01); *H04L 5/0053* (2013.01); *H04W 72/042* (2013.01)

(58) Field of Classification Search
CPC ... H04W 48/08; H04W 72/042; H04W 48/12; H04L 5/0053; H04L 1/0072; H04L 1/0075; H04L 5/00; H04L 1/0056
See application file for complete search history.

(56) References Cited

U.S. PATENT DOCUMENTS 10,341,078 B2 * 7/2019 Chavva ................. H04L 5/0048
2013/0301524 A1 11/2013 Xu et al.
(Continued)

FOREIGN PATENT DOCUMENTS

CN        103546920 A     1/2014
CN        104106272 A    10/2014
(Continued)

OTHER PUBLICATIONS

"Performance evaluation of channel codes for small block sizes," 3GPP TSG RAN WG1 Meeting #87, Reno, USA, pp. 1-30, R1-1611256, XP051190648, 3rd Generation Partnership Project, Valbonne, France (Nov. 14-18, 2016).

*Primary Examiner* — Ian N Moore
*Assistant Examiner* — Rushil Parimal Sampat
(74) *Attorney, Agent, or Firm* — Leydig, Voit & Mayer, Ltd.

(57) ABSTRACT

A method and device are provided for encoding a master information block (MIB), where the MIB includes indication information, the indication information is used by a terminal device to determine a decoding mode for decoding first information, and the first information includes at least one of a system information block (SIB) 1 and system information (SI); and sending an encoded MIB to the terminal device. The terminal device can determine a correct decoding mode for the SIB and the SI according to the indication information before receiving the SIB and the SI, and then the terminal device can decode the SIB and the SI (Continued)

in the correct decoding mode after receiving the SIB and the SI. The terminal device can flexibly decode the SIB and the SI.

11 Claims, 6 Drawing Sheets

(56) References Cited

U.S. PATENT DOCUMENTS

| | | | | |
|---|---|---|---|---|
| 2015/0079981 A1* | 3/2015 | Zhu | .................. | H04W 8/06 |
| | | | | 455/434 |
| 2015/0099528 A1 | 4/2015 | Hu et al. | | |
| 2015/0341957 A1 | 11/2015 | Tang et al. | | |
| 2016/0013810 A1* | 1/2016 | Gross | ................ | H03M 13/13 |
| | | | | 714/776 |
| 2017/0047947 A1* | 2/2017 | Hong | ............... | H03M 13/2906 |
| 2019/0349840 A1* | 11/2019 | Zhang | ................. | H04W 76/18 |
| 2019/0394705 A1* | 12/2019 | Yang | ............... | H04W 72/0446 |
| 2020/0244287 A1* | 7/2020 | Xu | ................ | H03M 13/616 |
| 2021/0258829 A1* | 8/2021 | Lin | .................. | H04W 8/24 |

FOREIGN PATENT DOCUMENTS

| | | | |
|---|---|---|---|
| CN | 104380805 A | 2/2015 | |
| CN | 105594297 A | 5/2016 | |
| EP | 2945405 A1 | 11/2015 | |
| WO | 2016121308 A1 | 8/2016 | |
| WO | 2016163071 A1 | 10/2016 | |

\* cited by examiner

INFORMATION ENCODING METHOD AND DEVICE FOR MASTER INFORMATION BLOCK ENCODING

CROSS-REFERENCE TO RELATED APPLICATIONS

This application is a continuation of International Application No. PCT/CN2018/073404, filed on Jan. 19, 2018, which claims priority to Chinese Patent Application No. 201710057559.1, filed on Jan. 26, 2017. The disclosures of the aforementioned applications are hereby incorporated by reference in their entireties.

TECHNICAL FIELD

Embodiments of this application relate to the field of communications technologies, and in particular, to an information encoding method and a device.

BACKGROUND

A system message is cell-level control information. A terminal (such as a mobile phone or a computer) needs to obtain a system message before successfully accessing a cell, so as to correctly work. The system message may include three types: a master information block (MIB), a system information block 1 (SIB 1), and system information (SI). A schematic structural diagram of an existing system message may be shown in FIG. 1.

Figure 1:
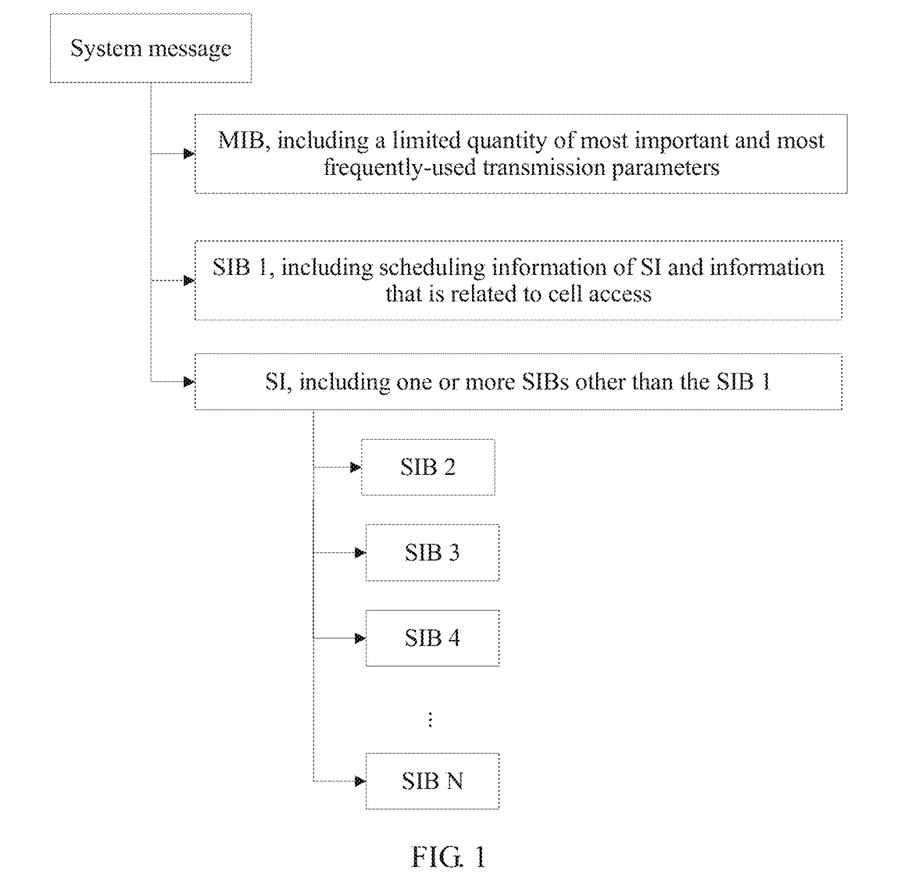
FIG. 1 is a schematic structural diagram of an existing system message.
Figure 2:
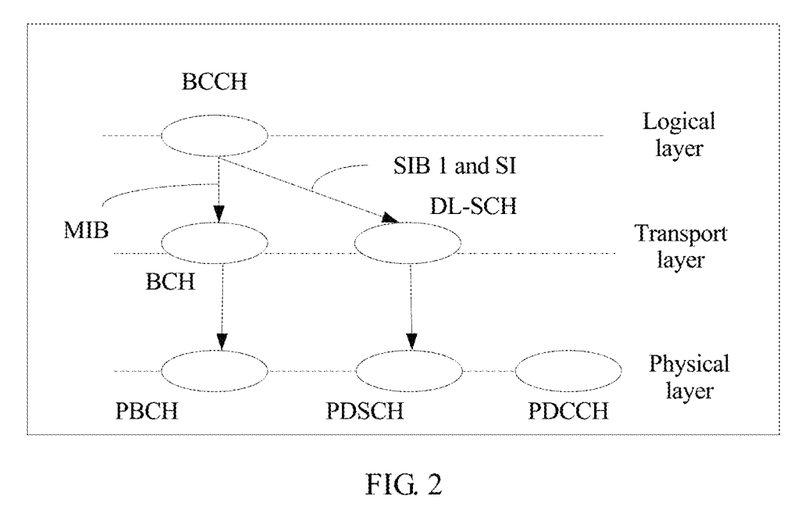
FIG. 2 is a schematic diagram of an existing channel mapping.

As shown in FIG. 1, the MIB includes a limited quantity of most important and most frequently-used transmission parameters that are used to read cell information. For example, the transmission parameters may include a system bandwidth, a system frame number, physical hybrid automatic repeat request indicator channel (physical hybrid arq indicator channel, PHICH) configuration information, and the like. FIG. 2 is a schematic diagram of an existing channel mapping. As shown in FIG. 2, a network device (such as a base station) transmits a MIB to a broadcast channel (BCH) through a broadcast control channel (BCCH), then transmits the MIB to a physical broadcast channel (PBCH) through the BCH, and encodes the MIB on the PBCH. Correspondingly, a terminal device (such as a mobile phone) decodes the MIB after receiving the MIB.

As shown in FIG. 1, the SIB 1 carries scheduling information of all SI and information that is related to cell access. The SI includes a SIB other than the SIB 1. For example, the SI may include a SIB 2, a SIB 3, and a SIB 4. As shown in FIG. 2, the network device transmits a SIB 1 (or SI) to a downlink shared channel (DL-SCH) through the BCCH, then transmits the SIB 1 (or the SI) to a physical downlink shared channel (PDSCH) through the DL-SCH, and encodes the SIB 1 (or the SI) on the PDSCH. Correspondingly, the terminal device decodes the SIB 1 (or the SI) after receiving the SIB 1 (or the SI).

Three types of scenarios are defined in a 5th generation (5G) communications system and subsequent more possible communications systems: enhanced mobile broadband (eMBB), ultra-reliable and low-latency communications (Ultra Reliable Low Latency Communications, URLLC), and massive Internet of things communications (massive Machine Type Communications, mMTC). An eMBB service mainly includes an ultra high definition video, augmented reality AR, virtual reality VR, and the like, and is mainly characterized by a large transmission data volume and a high transmission rate. A URLLC service is mainly used for industrial control, unmanned driving, and the like in the Internet of things, and is mainly characterized by ultra-high reliability, a low latency, a relatively small transmission data volume, and burstiness. An mMTC service is mainly used for a smart grid, a smart city, and the like in the Internet of things, and is mainly characterized by massive device connections, a small transmission data volume, and tolerance to a relatively long delay.

Different encoding and decoding modes may be required in different communication scenarios. After an encoding mode is flexibly selected to encode the system message, how to flexibly decode the system message is an urgent problem to be resolved currently.

SUMMARY

Embodiments of this application provide an information encoding method and a device, so that a terminal device can flexibly decode a system message.

According to a first aspect, an embodiment of this application provides an information encoding method. The method includes: encoding, by a network device, a master information block (MIB), where the MIB includes indication information, the indication information is used by a terminal device to determine a decoding mode for decoding first information, and the first information includes at least one of a system information block (SIB) 1 and system information (SI); and sending, by the network device, an encoded MIB to the terminal device.

It can be learned that according to the method described in the first aspect, the network device may encode the MIB including the indication information (which is used by the terminal device to determine the decoding mode for decoding the first information), and send the encoded MIB to the terminal device. Therefore, the terminal device can determine a correct decoding mode for the SIB and the SI according to the indication information before receiving the SIB and the SI, and then the terminal device can decode the SIB and the SI in the correct decoding mode after receiving the SIB and the SI. It can be learned that according to the method described in the first aspect, the terminal device can flexibly decode the SIB and the SI.

In an optional implementation, the indication information includes first indication information, and the first indication information is used to indicate an encoding mode used for the first information.

According to the implementation, the terminal device can successfully determine, according to the first indication information, the decoding mode for decoding the first information.

In an optional implementation, the indication information includes second indication information, and the second indication information is used to indicate the decoding mode for decoding the first information.

According to the implementation, the terminal device can successfully determine, according to the second indication information, the decoding mode for decoding the first information.

In an optional implementation, the indication information further includes third indication information, and the third indication information is used to indicate configuration information corresponding to the decoding mode.

According to the implementation, a success rate of decoding the first information by the terminal device can be increased by using the third indication information.

In an optional implementation, if the decoding mode for decoding the first information is layered normalized min-sum (LNMS) decoding, the configuration information is a scaling value. Decoding the first information based on the scaling value can increase a decoding success rate.

In an optional implementation, if the decoding mode for decoding the first information is layered offset min-sum (LOMS) decoding, the configuration information is an offset value. Decoding the first information based on the offset value can increase a decoding success rate.

In an optional implementation, if the decoding mode for decoding the first information is parity-check-aided successive cancellation list (PC-SCL) decoding, the configuration information is a successive cancellation list width. Decoding the first information based on the successive cancellation list width can increase a decoding success rate.

In an optional implementation, if the decoding mode for decoding the first information is cyclic redundancy check-aided successive cancellation list (CA-SCL) decoding, the configuration information is a successive cancellation list width. Decoding the first information based on the successive cancellation list width can increase a decoding success rate.

According to a second aspect, an embodiment of this application provides an information decoding method. The method includes: receiving, by a terminal device, an encoded MIB; decoding, by the terminal device, the encoded MIB to obtain indication information in the MIB; determining, by the terminal device, a decoding mode for first information according to the indication information; receiving, by the terminal device, encoded first information sent by a network device; and decoding, by the terminal device, the first information in the determined decoding mode, where the first information includes at least one of a system information block SIB 1 and system information SI.

It can be learned that according to the method described in the second aspect, the terminal device can determine a correct decoding mode for the SIB and the SI according to the indication information before receiving the SIB and the SI, and then the terminal device can decode the SIB and the SI in the correct decoding mode after receiving the SIB and the SI. It can be learned that according to the method described in the second aspect, the terminal device can flexibly decode the SIB and the SI.

According to a third aspect, an embodiment of this application provides an information encoding method. The method includes: encoding, by a network device, downlink control information (DCI), where the DCI includes indication information, the indication information is used by a terminal device to determine a decoding mode for decoding first information, and the first information includes at least one of a system information block SIB 1 and system information SI; and sending, by the network device, encoded DCI to the terminal device.

According to the method described in the third aspect, the network device may encode the DCI including the indication information (which is used by the terminal device to determine the decoding mode for decoding the first information), and send the encoded DCI to the terminal device. Therefore, the terminal device can determine a correct decoding mode for the SIB and the SI according to the indication information before receiving the SIB and the SI, and then the terminal device can decode the SIB and the SI in the correct decoding mode after receiving the SIB and the SI. It can be learned that according to the method described in the third aspect, the terminal device can flexibly decode the SIB and the SI.

In an optional implementation, the indication information includes first indication information, and the first indication information is used to indicate an encoding mode used for the first information. According to the implementation, the terminal device can successfully determine, according to the first indication information, the decoding mode for decoding the first information.

In an optional implementation, the indication information includes second indication information, and the second indication information is used to indicate the decoding mode for decoding the first information. According to the implementation, the terminal device can successfully determine, according to the second indication information, the decoding mode for decoding the first information.

In an optional implementation, the indication information further includes third indication information, and the third indication information is used to indicate configuration information corresponding to the decoding mode. According to the implementation, a success rate of decoding the first information by the terminal device can be increased by using the third indication information.

In an optional implementation, if the decoding mode for decoding the first information is layered normalized min-sum (LNMS) decoding, the configuration information is a scaling value. Decoding the first information based on the scaling value can increase a decoding success rate.

In an optional implementation, if the decoding mode for decoding the first information is layered offset min-sum (LOMS) decoding, the configuration information is an offset value. Decoding the first information based on the offset value can increase a decoding success rate.

In an optional implementation, if the decoding mode for decoding the first information is parity-check-aided successive cancellation list (PC-SCL) decoding, the configuration information is a successive cancellation list width. Decoding the first information based on the successive cancellation list width can increase a decoding success rate.

In an optional implementation, if the decoding mode for decoding the first information is cyclic redundancy check-aided successive cancellation list (CA-SCL) decoding, the configuration information is a successive cancellation list width. Decoding the first information based on the successive cancellation list width can increase a decoding success rate.

According to a fourth aspect, an embodiment of this application provides an information decoding method. The method includes: receiving, by a terminal device, encoded DCI; decoding, by the terminal device, the encoded DCI to obtain indication information in the DCI; determining, by the terminal device, a decoding mode for first information according to the indication information; receiving, by the terminal device, encoded first information sent by a network device; and decoding, by the terminal device, the first information in the determined decoding mode, where the first information includes at least one of a system information block SIB 1 and system information SI.

It can be learned that according to the method described in the fourth aspect, the terminal device can determine a correct decoding mode for the SIB and the SI according to the indication information before receiving the SIB and the SI, and then the terminal device can decode the SIB and the SI in the correct decoding mode after receiving the SIB and the SI. It can be learned that according to the method described in the fourth aspect, the terminal device can flexibly decode the SIB and the SI.

According to a fifth aspect, an embodiment of this application provides an information encoding method. The method includes: encoding, by a network device, a system information block SIB 1, where the SIB 1 includes indication information, and the indication information is used by a terminal device to determine a decoding mode for decoding system information SI; and sending, by the network device, an encoded SIB 1 to the terminal device.

According to the method described in the fifth aspect, the network device may encode the SIB 1 including the indication information (which is used by the terminal device to determine the decoding mode for decoding the SI), and send the encoded SIB 1 to the terminal device. Therefore, the terminal device can determine a correct decoding mode for the SI according to the indication information before receiving the SI, and then the terminal device can decode the SI in the correct decoding mode after receiving the SI. It can be learned that according to the method described in the fifth aspect, the terminal device can flexibly decode the SI.

In an optional implementation, the indication information includes first indication information, and the first indication information is used to indicate an encoding mode used for the SI.

According to the implementation, the terminal device can successfully determine, according to the first indication information, the decoding mode for decoding the SI.

In an optional implementation, the indication information includes second indication information, and the second indication information is used to indicate the decoding mode for decoding the SI.

According to the implementation, the terminal device can successfully determine, according to the second indication information, the decoding mode for decoding the SI.

In an optional implementation, the indication information further includes third indication information, and the third indication information is used to indicate configuration information corresponding to the decoding mode.

According to the implementation, a success rate of decoding the SI by the terminal device can be increased by using the third indication information.

In an optional implementation, if the decoding mode for decoding the SI is layered normalized min-sum (LNMS) decoding, the configuration information is a scaling value. Decoding the SI based on the scaling value can increase a decoding success rate.

In an optional implementation, if the decoding mode for decoding the SI is layered offset min-sum (LOMS) decoding, the configuration information is an offset value. Decoding the SI based on the offset value can increase a decoding success rate.

In an optional implementation, if the decoding mode for decoding the SI is cyclic redundancy check-aided successive cancellation list (CA-SCL) decoding, the configuration information is a successive cancellation list width. Decoding the SI based on the successive cancellation list width can increase a decoding success rate.

In an optional implementation, if the decoding mode for decoding the SI is cyclic redundancy check-aided successive cancellation list (CA-SCL) decoding, the configuration information is a successive cancellation list width. Decoding the SI based on the successive cancellation list width can increase a decoding success rate.

According to a sixth aspect, an embodiment of this application provides an information decoding method. The method includes: receiving, by a terminal device, an encoded SIB 1; decoding, by the terminal device, the encoded SIB 1 to obtain indication information in the SIB 1; determining, by the terminal device, a decoding mode for SI according to the indication information; receiving, by the terminal device, encoded SI sent by a network device; and decoding, by the terminal device, the SI in the determined decoding mode.

It can be learned that according to the method described in the sixth aspect, the terminal device can determine a correct decoding mode for the SI according to the indication information before receiving the SI, and then the terminal device can decode the SI in the correct decoding mode after receiving the SI. It can be learned that according to the method described in the sixth aspect, the terminal device can flexibly decode the SI.

According to a seventh aspect, a network device is provided. The network device has a function of implementing behavior of the network device in the first aspect, the possible implementations of the first aspect, the third aspect, the possible implementations of the third aspect, the fifth aspect, or the possible implementations of the fifth aspect. The function may be implemented by hardware, or may be implemented by hardware by executing corresponding software. The hardware or the software includes one or more units corresponding to the foregoing function. The unit may be software and/or hardware. Based on a same inventive concept, for a problem-resolving principle and beneficial effects of the network device, refer to the first aspect, the possible implementations of the first aspect, the third aspect, the possible implementations of the third aspect, the fifth aspect, or the possible implementations of the fifth aspect and the brought beneficial effects. No repeated description is provided.

According to an eighth aspect, a terminal device is provided. The terminal device has a function of implementing behavior of the terminal device in the second aspect, the fourth aspect, or the sixth aspect. The function may be implemented by hardware, or may be implemented by hardware by executing corresponding software. The hardware or the software includes one or more units corresponding to the foregoing function. The unit may be software and/or hardware. Based on a same inventive concept, for a problem-resolving principle and beneficial effects of the terminal device, refer to the second aspect, the fourth aspect, or the sixth aspect and the brought beneficial effects. No repeated description is provided.

According to a ninth aspect, a network device is provided. The network device includes a processor, a memory, a communications interface, and one or more programs. The processor, the communications interface, and the memory are connected. Optionally, the network device further includes a bus system, and the processor, the communications interface, and the memory are connected by using the bus system. The one or more programs are stored in the memory, and the processor invokes the programs stored in the memory to implement the solutions of the first aspect, the possible implementations of the first aspect, the third aspect, the possible implementations of the third aspect, the fifth aspect, or the possible implementations of the fifth aspect. For a problem-resolving implementation and beneficial effects of the network device, refer to the first aspect, the possible implementations of the first aspect, the third aspect, the possible implementations of the third aspect, the fifth aspect, or the possible implementations of the fifth aspect and the beneficial effects. No repeated description is provided.

According to a tenth aspect, a terminal device is provided. The terminal device includes a processor, a memory, a communications interface, and one or more programs. The processor, the communications interface, and the memory are connected. Optionally, the terminal device further includes a bus system, and the processor, the communications interface, and the memory are connected by using the bus system. The one or more programs are stored in the memory, and the processor invokes the programs stored in the memory to implement the solutions of the second aspect, the fourth aspect, or the sixth aspect. For a problem-resolving implementation and beneficial effects of the terminal device, refer to the second aspect, the fourth aspect, or the sixth aspect and the beneficial effects. No repeated description is provided.

According to an eleventh aspect, a communications system is provided. The system includes the network device in the seventh aspect and the terminal device in the eighth aspect.

DESCRIPTION OF EMBODIMENTS

The following further describes specific embodiments of this application in detail with reference to the accompanying drawings.

There are a plurality of communication scenarios in a 5th generation (5G) communications system and subsequent more possible communications systems, such as eMBB, URLLC, and mMTC. Different encoding and decoding modes may be required in different communication scenarios. However, after a network device (such as a base station) flexibly selects, based on a different communication scenario, an encoding mode to encode a system message, a mobile device (such as a mobile phone) does not know which decoding mode needs to be used to decode the system message. Therefore, after the network device flexibly selects, based on the different communication scenario, the encoding mode to encode the system message, the mobile device cannot flexibly decode the system message in a correct decoding mode.

To enable the mobile device to flexibly decode the system message, that is, to enable the mobile device to select the correct decoding mode for decoding, the embodiments of this application provide an information encoding method and a device.

Figure 3:
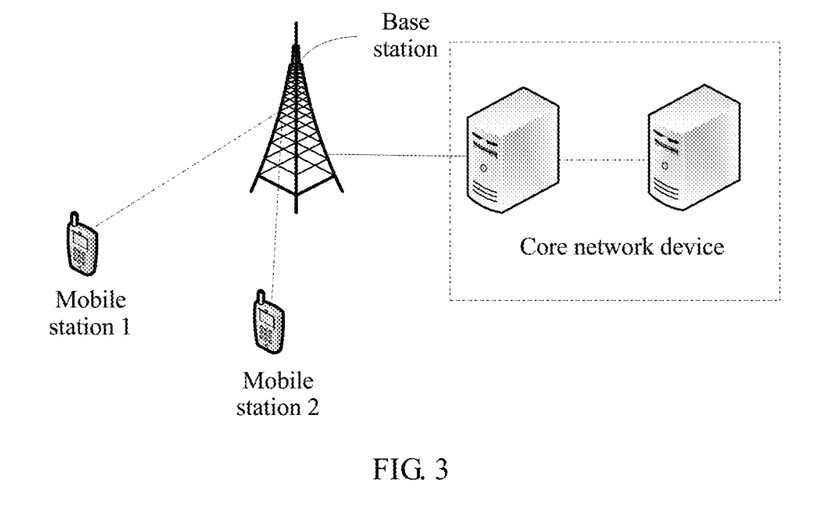
FIG. 3 is a schematic diagram of a communications system according to an embodiment of this application.

The embodiments of this application may be applied to a wireless communications system. The wireless communications system usually includes a cell. Each cell includes a base station (BS), and the base station provides a communications service for a plurality of mobile stations (MS). As shown in FIG. 3, the base station is connected to a core network device. The network device in the embodiments of this application may be the base station in FIG. 3 or a baseband processing unit (BBU). The mobile device in the embodiments of this application may be the mobile station in FIG. 3.

It should be noted that the wireless communications system in the embodiments of this application includes, but is not limited to: a narrowband Internet of things (NB-IoT) system, a global system for mobile communications (GSM), an enhanced data rates for GSM evolution (EDGE) system, a wideband code division multiple access (WCDMA) system, a code division multiple access 2000 (CDMA2000) system, a time division-synchronous code division multiple access (TD-SCDMA) system, a long term evolution (LTE) system, and three major application scenarios eMBB, URLLC and eMTC in a next-generation 5G mobile communications system.

In the embodiments of this application, the base station is an apparatus that is deployed on a radio access network to provide a wireless communication function for the mobile station. The base station may include a macro base station, a micro base station (also referred to as a small cell), a relay station, an access point, and the like in various forms. In systems that use different radio access technologies, names of a device that has a base station function may be different. For example, in an LTE system, the device is referred to as an evolved NodeB (eNB or eNodeB); and in a 3rd generation (3G) system, the device is referred to as a NodeB. For ease of description, in all the embodiments of this application, all the foregoing apparatuses that provide a wireless communication function for the mobile station are collectively referred to as a base station or a BS.

The mobile station in the embodiments of this application may include various handheld devices, in-vehicle devices, wearable devices, or computing devices that have a wireless communication function, or other processing devices connected to a wireless modem. The mobile station may also be referred to as a terminal, or may include a subscriber unit, a cellular phone, a smartphone, a wireless data card, a personal digital assistant (PDA) computer, a tablet computer, a wireless modem, a handheld device, a laptop computer, a machine type communication (MTC) terminal, or the like.

To facilitate understanding of the embodiments of this application, the following describes an existing system message obtaining process.

Figure 4:
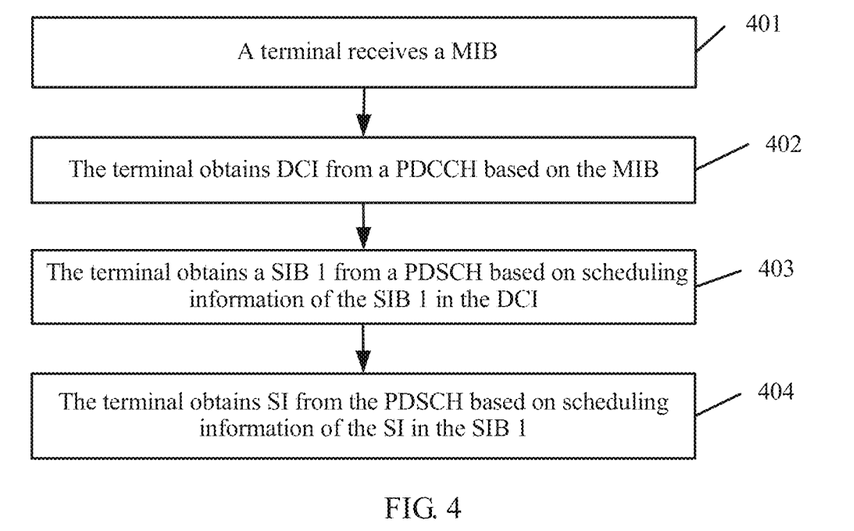
FIG. 4 is a schematic diagram of an existing system message obtaining process.

FIG. 4 is a schematic diagram of an existing system message obtaining process. As shown in FIG. 4, after receiving a MIB, a terminal device (such as a mobile phone) obtains specific downlink control information (DCI) of a physical downlink control channel (PDCCH) based on the MIB. After obtaining the DCI information, the terminal device obtains a SIB 1 from a PDSCH based on scheduling information of the SIB 1 in the DCI information. After obtaining the SIB 1, the terminal obtains SI from the PDSCH based on scheduling information of the SI in the SIB 1.

The following further describes an information encoding method and a device that are provided in this application.

Figure 5:
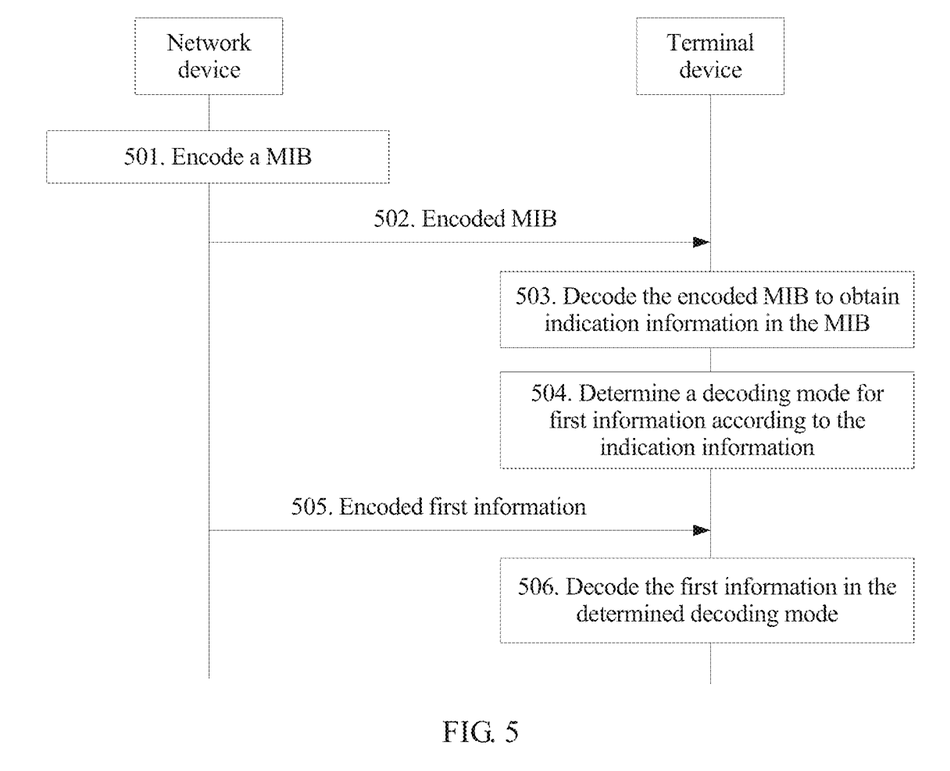
FIG. 5 is a schematic flowchart of an information encoding method according to an embodiment of this application.

FIG. 5 shows an information encoding method according to an embodiment of this application. As shown in FIG. 5, the information encoding method includes the following parts: 501 and 502.

501. A network device encodes a MIB.

The MIB includes indication information. The indication information is used by a terminal device to determine a decoding mode for decoding first information, and the first information includes at least one of a SIB 1 and SI.

502. The network device sends an encoded MIB to a terminal device.

503. The terminal device decodes the encoded MIB to obtain indication information in the MIB.

After receiving the MIB, the terminal device may decode the MIB to obtain the indication information in the MIB.

504. The terminal device determines a decoding mode for first information according to the indication information.

After decoding the MIB to obtain the indication information, the terminal device determines the decoding mode for the first information according to the indication information.

505. The terminal device receives encoded first information sent by the network device.

The terminal device receives the encoded first information after receiving the encoded MIB.

506. The terminal device decodes the first information in the determined decoding mode.

After receiving the encoded first information, the terminal device decodes the first information in the determined decoding mode.

For example, polar code encoding includes encoding using a parity-check polar code (PC-polar code) and encoding using a cyclic redundancy check-aided polar code (CA-polar code). If encoding is performed by using the PC-polar code, parity-check-aided successive cancellation list (PC-SCL) decoding needs to be performed. If encoding is performed by using the CA-polar code, cyclic redundancy check-aided successive cancellation list (crc aided successive cancellation list, CA-SCL) decoding needs to be performed. Therefore, if the first information is the SIB 1 and the SI, and the network device encodes the SIB 1 and the SI by using the PC-polar code, the terminal device may determine, according to the indication information, that a decoding mode for decoding the SIB 1 and the SI is the PC-SCL decoding. If the network device encodes the SIB 1 and the SI by using the CA-polar code, the terminal device may determine, according to the indication information, that a decoding mode for decoding the SIB 1 and the SI is the CA-SCL decoding.

For another example, if the first information is the SIB 1 and the SI, and the network device encodes the SIB 1 and the SI by using a low-density parity-check (LDPC) code, the terminal device may determine, according to the indication information, that a decoding mode for decoding the SIB 1 and the SI is a decoding mode corresponding to the LDPC code. For example, the decoding mode corresponding to the LDPC code may include layered normalized min-sum (LNMS) decoding, layered offset min-sum (LOMS) decoding, and the like.

According to the method described in FIG. 5, the network device may encode the MIB including the indication information (which is used by the terminal device to determine the decoding mode for decoding the first information), and send the encoded MIB to the terminal device. Therefore, the terminal device can determine a correct decoding mode for the SIB and the SI according to the indication information before receiving the SIB and the SI, and then the terminal device can decode the SIB and the SI in the correct decoding mode after receiving the SIB and the SI. It can be learned that according to the method described in FIG. 5, the terminal device can flexibly decode the SIB and the SI.

In an optional implementation, the indication information included in the MIB includes first indication information, and the first indication information is used to indicate an encoding mode used for the first information. For example, the encoding mode may be a polar code encoding mode, an LDPC code encoding mode, or the like. This is not limited in this embodiment of this application.

In the implementation, optionally, the terminal device may preset a decoding mode (such as the PC-SCL decoding) corresponding to the polar code encoding mode and a decoding mode (such as the LNMS decoding) corresponding to the LDPC code encoding mode. Optionally, the first indication information may be a 1-bit binary code. For example, a binary code 0 may indicate the polar code encoding mode, and a binary code 1 may indicate the LDPC code encoding mode. After the terminal device obtains the first indication information through decoding, if the first indication information is 0, the terminal device decodes the first information in a PC-SCL decoding mode; or if the first indication information is 1, the terminal device decodes the first information in an LNMS decoding mode.

According to the implementation, the terminal device can successfully determine, according to the first indication information, the decoding mode for decoding the first information.

In an optional implementation, the indication information included in the MIB includes second indication information, and the second indication information is used to indicate the decoding mode for decoding the first information. For example, if the network device encodes the first information in the polar code encoding mode, and the terminal device needs to use the PC-SCL decoding mode to correctly decode the first information, the second indication information is used to indicate that the decoding mode for decoding the first information is the PC-SCL decoding mode. Likewise, the second indication information may be indicated in a binary manner. For example, a binary code 00 indicates the PC-SCL decoding mode, a binary code 01 indicates a CA-SCL decoding mode, a binary code 10 indicates the LNMS decoding mode, and a binary code 11 indicates an LOMS decoding mode.

According to the implementation, the terminal device can successfully determine, according to the second indication information, the decoding mode for decoding the first information.

In an optional implementation, the indication information included in the MIB may alternatively include both the first indication information and the second indication information. For example, as shown in Table 1, if the first indication information is a binary code 0, the polar code encoding mode is indicated, or if the first indication information is a binary code 1, the LDPC code encoding mode is indicated. When the first indication information is 0, and the second indication information is a binary code 0, the PC-SCL decoding mode is indicated. When the first indication information is 0, and the second indication information is a binary code 1, the CA-SCL decoding mode is indicated. When the first indication information is 1, and the second indication information is a binary code 0, the LNMS decoding mode is indicated. When the first indication information is 1, and the second indication information is the binary code 1, the LOMS decoding mode is indicated.

TABLE 1

| First indication information | Second indication information | Encoding mode |
|---|---|---|
| 0 | 0 | PC-SCL decoding mode |
|   | 1 | CA-SCL decoding mode |
| 1 | 0 | LNMS decoding mode |
|   | 1 | LOMS decoding mode |

According to the implementation, the terminal device can successfully determine, according to the first indication information and the second indication information, the decoding mode for decoding the first information.

In an optional implementation, the MIB may further include third indication information, and the third indication information is used to indicate configuration information corresponding to the decoding mode for the first information. Optionally, the MIB may include only the first indication information and the third indication information, or the MIB may include only the second indication information and the third indication information, or the MIB may include all of the first indication information, the second indication information, and the third indication information.

According to the implementation, a success rate of decoding the first information by the terminal device can be increased by using the third indication information.

In an optional implementation, if the decoding mode for decoding the first information is the LNMS decoding, the configuration information is a scaling value.

Decoding the first information based on the scaling value can increase a decoding success rate.

In an optional implementation, if the decoding mode for decoding the first information is the LOMS decoding, the configuration information is an offset value.

Decoding the first information based on the offset value can increase a decoding success rate.

In an optional implementation, if the decoding mode for decoding the first information is the parity-check-aided successive cancellation list PC-SCL decoding, the configuration information is a successive cancellation list width.

Decoding the first information based on the successive cancellation list width can increase a decoding success rate.

In an optional implementation, if the decoding mode for decoding the first information is the cyclic redundancy check-aided successive cancellation list CA-SCL decoding, the configuration information is a successive cancellation list width.

Decoding the first information based on the successive cancellation list width can increase a decoding success rate.

Figure 6:
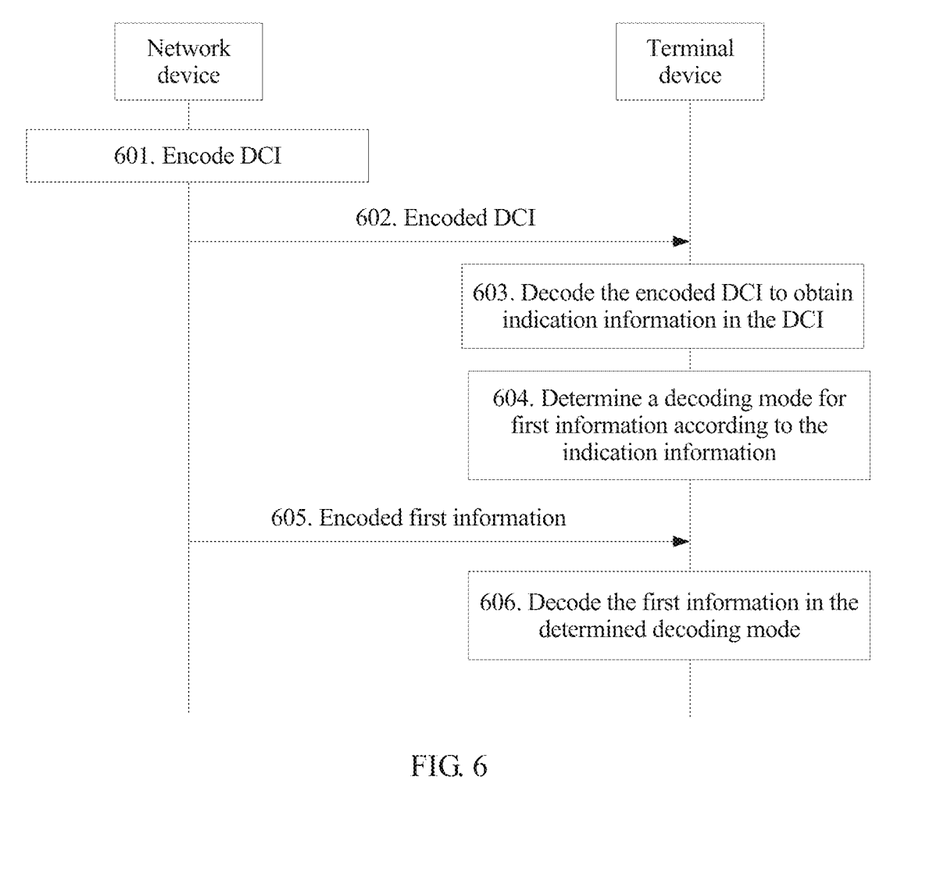
FIG. 6 is a schematic flowchart of another information encoding method according to an embodiment of this application.

FIG. 6 shows another information encoding method according to an embodiment of this application. As shown in FIG. 6, the information encoding method includes the following parts: 601 and 602.

601. A network device encodes DCI.

The DCI includes indication information. The indication information is used by a terminal device to determine a decoding mode for decoding first information, and the first information includes at least one of a system information block SIB 1 and system information SI.

602. The network device sends encoded DCI to a terminal device.

603. The terminal device decodes the encoded DCI to obtain indication information in the DCI.

After receiving the DCI, the terminal device may decode the DCI to obtain the indication information in the DCI.

604. The terminal device determines a decoding mode for first information according to the indication information.

After decoding the DCI to obtain the indication information, the terminal device determines the decoding mode for the first information according to the indication information.

605. The terminal device receives encoded first information sent by the network device.

The terminal device receives the encoded first information after receiving the encoded DCI.

606. The terminal device decodes the first information in the determined decoding mode.

After receiving the encoded first information, the terminal device decodes the first information in the determined decoding mode.

For example, if the first information is the SIB 1 and the SI, and the network device encodes the SIB 1 and the SI by using a PC-polar code, the terminal device may determine, according to the indication information, that a decoding mode for decoding the SIB 1 and the SI is PC-SCL decoding. If the network device encodes the SIB 1 and the SI by using a CA-polar code, the terminal device may determine, according to the indication information, that a decoding mode for decoding the SIB 1 and the SI is CA-SCL decoding.

For another example, if the first information is the SIB 1 and the SI, and the network device encodes the SIB 1 and the SI by using an LDPC code, the terminal device may determine, according to the indication information, that a decoding mode for decoding the SIB 1 and the SI is a decoding mode corresponding to the LDPC code. For example, the decoding mode corresponding to the LDPC code may include LNMS decoding, LOMS decoding, and the like.

According to the method described in FIG. 6, the network device may encode the DCI including the indication information (which is used by the terminal device to determine the decoding mode for decoding the first information), and send the encoded DCI to the terminal device. Therefore, the terminal device can determine a correct decoding mode for the SIB and the SI according to the indication information before receiving the SIB and the SI, and then the terminal device can decode the SIB and the SI in the correct decoding mode after receiving the SIB and the SI. It can be learned that according to the method described in FIG. 6, the terminal device can flexibly decode the SIB and the SI.

In an optional implementation, the indication information included in the DCI includes first indication information, and the first indication information is used to indicate an encoding mode used for the first information. For example, the encoding mode may be a polar code encoding mode, an LDPC code encoding mode, or the like. This is not limited in this embodiment of this application.

An implementation principle of the implementation is the same as an implementation principle of a case in which the MIB includes the first indication information in the embodiment shown in FIG. 5. For details, refer to the description corresponding to the case in which the MIB includes the first indication information.

According to the implementation, the terminal device can successfully determine, according to the first indication information, the decoding mode for decoding the first information.

In an optional implementation, the indication information included in the DCI includes second indication information, and the second indication information is used to indicate the decoding mode for decoding the first information. For example, if the network device encodes the first information in the polar code encoding mode, and the terminal device needs to use a PC-SCL decoding mode to correctly decode the first information, the second indication information is used to indicate that the decoding mode for decoding the first information is the PC-SCL decoding mode. Likewise, the second indication information may be indicated in a binary manner. For example, a binary code 00 indicates the PC-SCL decoding mode, a binary code 01 indicates a CA-SCL decoding mode, a binary code 10 indicates an LNMS decoding mode, and a binary code 11 indicates an LOMS decoding mode.

According to the implementation, the terminal device can successfully determine, according to the second indication information, the decoding mode for decoding the first information.

In an optional implementation, the indication information included in the DCI may alternatively include both the first indication information and the second indication information.

An implementation principle of the implementation is the same as an implementation principle of a case in which the MIB includes both the first indication information and the second indication information in the embodiment shown in FIG. 5. For details, refer to the description corresponding to the case in which the MIB includes both the first indication information and the second indication information.

According to the implementation, the terminal device can successfully determine, according to the first indication information and the second indication information, the decoding mode for decoding the first information.

In an optional implementation, the DCI may further include third indication information, and the third indication information is used to indicate configuration information corresponding to the decoding mode for the first information. Optionally, the DCI may include only the first indication information and the third indication information, or the DCI may include only the second indication information and the third indication information, or the DCI may include all of the first indication information, the second indication information, and the third indication information.

According to the implementation, a success rate of decoding the first information by the terminal device can be increased by using the third indication information.

In an optional implementation, if the decoding mode for decoding the first information is the LNMS decoding, the configuration information is a scaling value.

Decoding the first information based on the scaling value can increase a decoding success rate.

In an optional implementation, if the decoding mode for decoding the first information is the LOMS decoding, the configuration information is an offset value.

Decoding the first information based on the offset value can increase a decoding success rate.

In an optional implementation, if the decoding mode for decoding the first information is the parity-check-aided successive cancellation list PC-SCL decoding, the configuration information is a successive cancellation list width.

Decoding the first information based on the successive cancellation list width can increase a decoding success rate.

In an optional implementation, if the decoding mode for decoding the first information is the cyclic redundancy check-aided successive cancellation list CA-SCL decoding, the configuration information is a successive cancellation list width.

Decoding the first information based on the successive cancellation list width can increase a decoding success rate.

Figure 7:
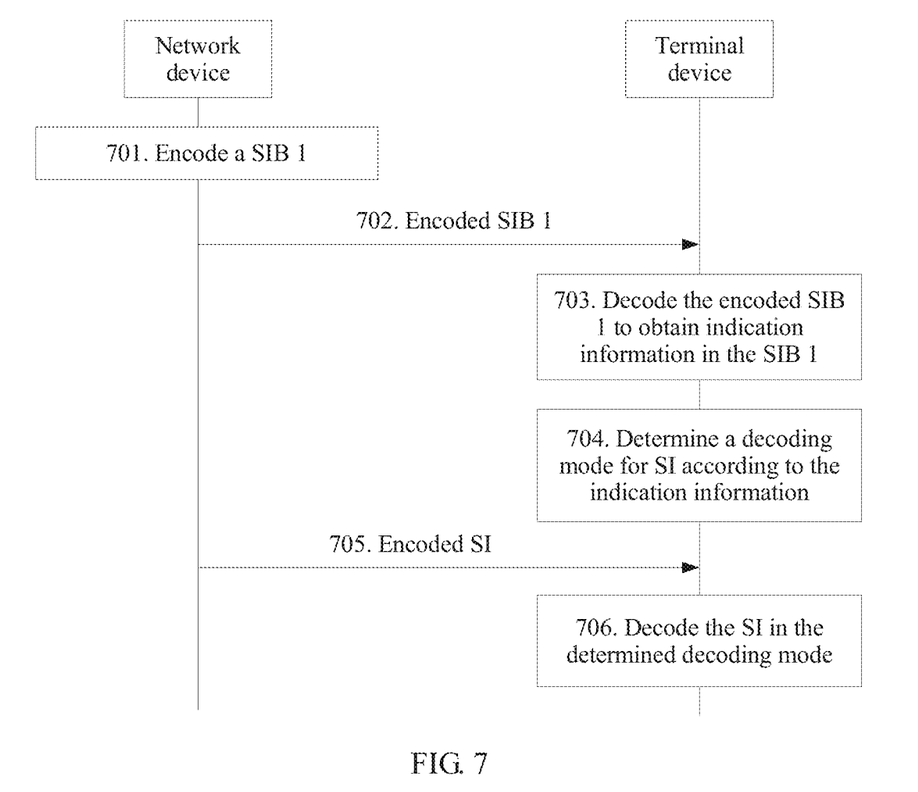
FIG. 7 is a schematic flowchart of still another information encoding method according to an embodiment of this application.

FIG. 7 shows another information encoding method according to an embodiment of this application. As shown in FIG. 7, the information encoding method includes the following parts: 701 and 702.

701. A network device encodes a SIB 1.

The SIB 1 includes indication information, and the indication information is used by a terminal device to determine a decoding mode for decoding SI. Optionally, if all SI is encoded in a same encoding mode, the indication information is used by the terminal device to determine a uniform decoding mode for decoding all the SI. Optionally, if each piece of SI is encoded in a different encoding mode, the indication information includes indication information corresponding to each piece of SI, and each indication information is used by the terminal device to determine a decoding mode for decoding the SI corresponding to the indication information. For example, if first SI and second SI are encoded in different encoding modes, the SIB 1 includes indication information 1 corresponding to the first SI and indication information 2 corresponding to the second SI. The indication information 1 is used by the terminal device to determine a decoding mode for decoding the first SI, and the indication information 2 is used by the terminal device to determine a decoding mode for decoding the second SI.

702. The network device sends an encoded SIB 1 to a terminal device.

703. The terminal device decodes the encoded SIB 1 to obtain indication information in the SIB 1.

After receiving the SIB 1, the terminal device may decode the SIB 1 to obtain the indication information in the SIB 1.

704. The terminal device determines a decoding mode for SI according to the indication information.

After decoding the SIB 1 to obtain the indication information, the terminal device determines the decoding mode for the SI according to the indication information.

705. The terminal device receives encoded SI sent by the network device.

The terminal device receives the SI after receiving the encoded SIB 1.

706. The terminal device decodes the SI in the determined decoding mode.

After receiving the encoded SI, the terminal device decodes the SI in the determined decoding mode.

For example, if the network device encodes the SI by using a PC-polar code, the terminal device may determine, according to the indication information, that the decoding mode for decoding the SI is PC-SCL decoding. If the network device encodes the SI by using a CA-polar code, the terminal device may determine, according to the indication information, that the decoding mode for decoding the SI is CA-SCL decoding.

For another example, the network device encodes the SI by using an LDPC code, the terminal device may determine, according to the indication information, that the decoding mode for decoding the SI is a decoding mode corresponding to the LDPC code. For example, the decoding mode corresponding to the LDPC code may include LNMS decoding, LOMS decoding, and the like.

According to the method described in FIG. 7, the network device may encode the SIB 1 including the indication information (which is used by the terminal device to determine the decoding mode for decoding the SI), and send the encoded SIB 1 to the terminal device. Therefore, the terminal device can determine a correct decoding mode for the SI according to the indication information before receiving the SI, and then the terminal device can decode the SI in the correct decoding mode after receiving the SI. It can be learned that according to the method described in FIG. 7, the terminal device can flexibly decode the SI.

In an optional implementation, the indication information included in the SIB 1 includes first indication information, and the first indication information is used to indicate an encoding mode used for the SI. For example, the encoding mode may be a polar code encoding mode, an LDPC code encoding mode, or the like. This is not limited in this embodiment of this application.

An implementation principle of the implementation is the same as an implementation principle of a case in which the MIB includes the first indication information in the embodiment shown in FIG. 5. For details, refer to the description corresponding to the case in which the MIB includes the first indication information.

According to the implementation, the terminal device can successfully determine, according to the first indication information, the decoding mode for decoding the SI.

In an optional implementation, the indication information included in the SIB 1 includes second indication information, and the second indication information is used to indicate the decoding mode for decoding the SI. For example, if the network device encodes the SI in the polar code encoding mode, and the terminal device needs to use a PC-SCL decoding mode to correctly decode the SI, the second indication information is used to indicate that the decoding mode for decoding the SI is the PC-SCL decoding mode. Likewise, the second indication information may be indicated in a binary manner. For example, a binary code 00 indicates the PC-SCL decoding mode, a binary code 01 indicates a CA-SCL decoding mode, a binary code 10 indicates an LNMS decoding mode, and a binary code 11 indicates an LOMS decoding mode.

According to the implementation, the terminal device can successfully determine, according to the second indication information, the decoding mode for decoding the SI.

In an optional implementation, the indication information included in the SIB 1 may alternatively include both the first indication information and the second indication information.

An implementation principle of the implementation is the same as an implementation principle of a case in which the MIB includes both the first indication information and the second indication information in the embodiment shown in FIG. 5. For details, refer to the description corresponding to the case in which the MIB includes both the first indication information and the second indication information.

According to the implementation, the terminal device can successfully determine, according to the first indication information and the second indication information, the decoding mode for decoding the SI.

In an optional implementation, the SIB 1 may further include third indication information, and the third indication information is used to indicate configuration information corresponding to the decoding mode for the SI. Optionally, the SIB 1 may include only the first indication information and the third indication information, or the SIB 1 may include only the second indication information and the third indication information, or the SIB 1 may include all of the first indication information, the second indication information, and the third indication information.

According to the implementation, a success rate of decoding the SI by the terminal device can be increased by using the third indication information.

In an optional implementation, if the decoding mode for decoding the SI is the LNMS decoding, the configuration information is a scaling value.

Decoding the SI based on the scaling value can increase a decoding success rate.

In an optional implementation, if the decoding mode for decoding the SI is the LOMS decoding, the configuration information is an offset value.

Decoding the SI based on the offset value can increase a decoding success rate.

In an optional implementation, if the decoding mode for decoding the SI is the parity-check-aided successive cancellation list PC-SCL decoding, the configuration information is a successive cancellation list width.

Decoding the SI based on the successive cancellation list width can increase a decoding success rate.

In an optional implementation, if the decoding mode for decoding the SI is cyclic redundancy check-aided successive cancellation list CA-SCL decoding, the configuration information is a successive cancellation list width.

Decoding the SI based on the successive cancellation list width can increase a decoding success rate.

An embodiment of this application provides a network device. The network device has a function of implementing behavior of the network device described in FIG. 5, the network device described in FIG. 6, or the network device described in FIG. 7 in the foregoing method embodiment. The function may be implemented by hardware, or may be implemented by hardware by executing corresponding software. The hardware or the software includes one or more units corresponding to the foregoing function. The unit may be software and/or hardware. Based on a same inventive concept, for a problem-resolving principle and beneficial effects of the network device, refer to the method implementations of the network device and the brought beneficial effects in the foregoing method embodiments. Therefore, for implementation of the network device, refer to the method implementations of the network device in the foregoing method embodiments. No repeated description is provided.

An embodiment of this application provides a terminal device. The network device has a function of implementing behavior of the terminal device described in FIG. 5, the terminal device described in FIG. 6, or the terminal device described in FIG. 7 in the foregoing method embodiment. The function may be implemented by hardware, or may be implemented by hardware by executing corresponding software. The hardware or the software includes one or more units corresponding to the foregoing function. The unit may be software and/or hardware. Based on a same inventive concept, for a problem-resolving principle and beneficial effects of the terminal device, refer to the method implementations of the terminal device and the brought beneficial effects in the foregoing method embodiments. Therefore, for implementation of the terminal device, refer to the method implementations of the terminal device in the foregoing method embodiments. No repeated description is provided.

Figure 8:
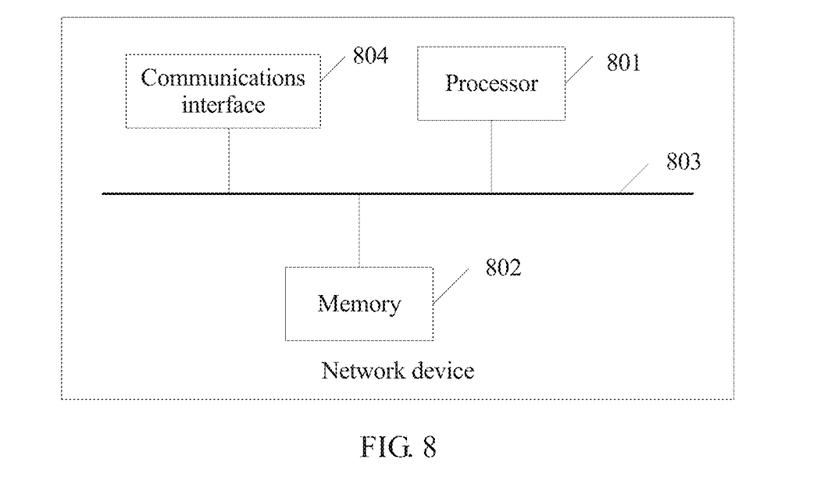
FIG. 8 is a schematic structural diagram of a network device according to an embodiment of this application.

FIG. 8 is a possible schematic structural diagram of a network device according to an embodiment of this application. As shown in FIG. 8, the network device 800 includes a processor 801, a memory 802, and a communications interface 804. The processor 801, the memory 802, and the communications interface 804 are connected. Optionally, the network device 800 further includes a bus system 803. The processor 801, the memory 802, and the communications interface 804 are connected by using the bus system 803.

The processor 801 may be a central processing unit (CPU), a general purpose processor, a coprocessor, a digital signal processor (DSP), an application-specific integrated circuit (ASIC), a field programmable gate array (FPGA), or another programmable logic device, a transistor logic device, a hardware component, or any combination thereof. Alternatively, the processor 801 may be a combination of processors implementing a computing function, for example, a combination of one or more microprocessors, or a combination of the DSP and a microprocessor.

The bus system 803 may be a peripheral component interconnect (PCI) bus, an extended industry standard architecture (EISA) bus, or the like. The bus system 803 may be classified into an address bus, a data bus, a control bus, and the like. For ease of indication, the bus system 803 is indicated by using only one bold line in FIG. 8, but this does not mean that there is only one bus or only one type of bus.

The communications interface 804 is configured to implement communication with another network element (for example, a terminal device).

The processor 801 invokes program code stored in the memory 802, to perform any one or more steps performed by the network device in FIG. 5, FIG. 6, or FIG. 7 in the foregoing method embodiment.

Based on a same inventive concept, a problem-resolving principle of the network device provided in this embodiment of this application is similar to that of the method embodiment of this application. Therefore, for implementation of the network device, refer to the implementation of the method. For brevity of description, details are not described herein again.

Figure 9:
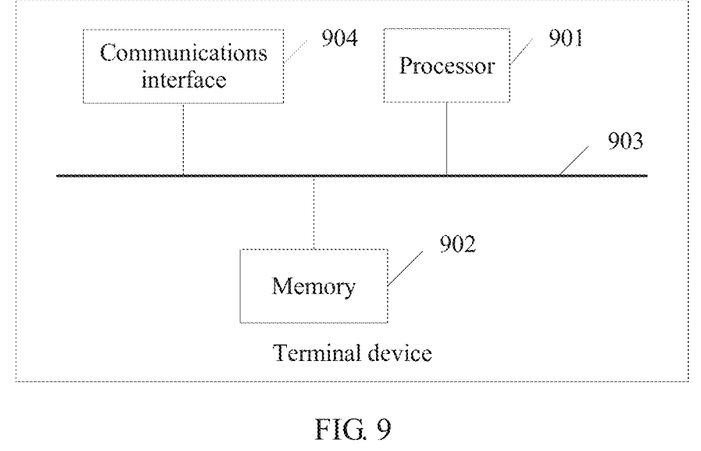
FIG. 9 is a schematic structural diagram of a terminal device according to an embodiment of this application.

FIG. 9 is a possible schematic structural diagram of a terminal device according to an embodiment of this application. As shown in FIG. 9, the terminal device 900 includes a processor 901, a memory 902, and a communications interface 904. The processor 901, the memory 902, and the communications interface 904 are connected. Optionally, the terminal device 900 further includes a bus system 903. The processor 901, the memory 902, and the communications interface 904 are connected by using the bus system 903.

The processor 901 may be a central processing unit (CPU), a general purpose processor, a coprocessor, a digital signal processor (DSP), an application-specific integrated circuit (ASIC), a field programmable gate array (FPGA), or another programmable logic device, a transistor logic device, a hardware component, or any combination thereof. Alternatively, the processor 901 may be a combination of processors implementing a computing function, for example, a combination of one or more microprocessors, or a combination of the DSP and a microprocessor.

The bus system 903 may be a peripheral component interconnect (PCI) bus or an extended industry standard architecture (EISA) bus, or the like. The bus system 903 may be classified into an address bus, a data bus, a control bus, and the like. For ease of indication, the bus system 903 is indicated by using only one bold line in FIG. 9, but this does not mean that there is only one bus or only one type of bus.

The communications interface 904 is configured to implement communication with another network element (for example, a network device).

The processor 901 invokes program code stored in the memory 902, to perform any one or more steps performed by the terminal device in FIG. 5, FIG. 6, or FIG. 7 in the foregoing method embodiment.

Based on a same inventive concept, a problem-resolving principle of the terminal device provided in this embodiment of this application is similar to that of the method embodiment of this application. Therefore, for implementation of the terminal device, refer to the implementation of the method. For brevity of description, details are not described herein again.

An embodiment of this application further provides a communications system. The system includes a network device and a terminal device. The network device is configured to perform the steps performed by the network device in FIG. 5, FIG. 6, or FIG. 7 in the foregoing method embodiment. The terminal device is configured to perform the steps performed by the terminal device in FIG. 5, FIG. 6, or FIG. 7 in the foregoing method embodiment.

In the foregoing embodiments, the description of each embodiment has respective focuses. For a part that is not described in detail in an embodiment, refer to related descriptions in other embodiments.

Finally, it should be noted that the foregoing embodiments are merely intended for describing the technical solutions of this application other than limiting this application. Although this application is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions in the embodiments of this application.

What is claimed is:

1. An information encoding method, the method comprising:

encoding, by a network device, a master information block (MIB), wherein the MIB comprises indication information, the indication information is used by a terminal device to determine a decoding mode for decoding first information, and the first information comprises at least one of a system information block (SIB) 1 and system information (SI); and sending, by the network device, the encoded MIB to the terminal device, wherein the indication information comprises first indication information, the first indication information is used to indicate an encoding mode between a polar code encoding mode and a Low-density Parity-check (LDPC) code encoding mode, and the encoding mode is used for encoding the first information, wherein the indication information further comprises second indication information, and the second indication information is used to indicate the decoding mode associated with the encoding mode indicated by the first indication information, and the decoding mode associated with the encoding mode is used for decoding the first information, wherein the indication information further comprises third indication information, and the third indication information is used to indicate configuration information corresponding to the decoding mode, and wherein the decoding mode is determined among a plurality of decoding modes preset in the terminal device, and wherein the plurality of decoding modes preset in the terminal device comprise: a parity-check-aided successive cancellation list (PC-SCL) decoding mode, a cyclic redundancy check-aided successive cancellation list (CA-SCL) decoding mode, a layered normalized min-sum (LNMS) decoding mode, and a layered offset min-sum (LOMS) decoding mode.

2. The method according to claim 1, wherein if the decoding mode for decoding the first information is LNMS decoding, the configuration information is a scaling value.

3. The method according to claim 1, wherein if the decoding mode for decoding the first information is LOMS decoding, the configuration information is an offset value.

4. The method according to claim 1, wherein if the decoding mode for decoding the first information is PC-SCL decoding, the configuration information is a successive cancellation list width.

5. The method according to claim 1, wherein if the decoding mode for decoding the first information is CA-SCL decoding, the configuration information is a successive cancellation list width.

6. A network device, comprising:
a processor; and
a memory storing instructions that when executed configure the processor to perform an information encoding method comprising:
encoding a master information block (MIB), wherein the MIB comprises indication information, the indication information is used by a terminal device to determine a decoding mode for decoding first information, and the first information comprises at least one of a system information block (SIB) 1 and system information SI; and
sending the encoded MIB to the terminal device,
wherein the indication information comprises first indication information, the first indication information is used to indicate an encoding mode between a polar code encoding mode and a Low-density Parity-check (LDPC) code encoding mode, and the encoding mode is used for encoding the first information,
wherein the indication information further comprises second indication information, and the second indication information is used to indicate the decoding mode associated with the encoding mode indicated by the first indication information, and the decoding mode associated with the encoding mode is used for decoding the first information,
wherein the indication information further comprises third indication information, and the third indication information is used to indicate configuration information corresponding to the decoding mode, and
wherein the decoding mode is determined among a plurality of decoding modes preset in the terminal device, and wherein the plurality of decoding modes preset in the terminal device comprise: a parity-check-aided successive cancellation list (PC-SCL) decoding mode, a cyclic redundancy check-aided successive cancellation list (CA-SCL) decoding mode, a layered normalized min-sum (LNMS) decoding mode, and a layered offset min-sum (LOMS) decoding mode.

7. The network device according to claim 6, wherein if the decoding mode for decoding the first information is LNMS decoding, the configuration information is a scaling value.

8. The network device according to claim 6, wherein if the decoding mode for decoding the first information is LOMS decoding, the configuration information is an offset value.

9. The network device according to any one of claim 6, wherein if the decoding mode for decoding the first information is PC-SCL decoding, the configuration information is a successive cancellation list width.

10. The network device according to any one of claim 6, wherein if the decoding mode for decoding the first information is CA-SCL decoding, the configuration information is successive cancellation list width.

11. A network device comprising:
a processor;
a memory;
a communications interface; and
one or more programs stored in the memory,
wherein the processor, the communications interface, and the memory are connected, and
wherein the processor invokes the one or more programs stored in the memory to implement a method comprising:
encoding a master information block (MIB), wherein the MIB comprises indication information, the indication information is used by a terminal device to determine a decoding mode for decoding first information, and the first information comprises at least one of a system information block (SIB) 1 and system information (SI); and
sending the encoded MIB to the terminal device,
wherein the indication information comprises first indication information, the first indication information is used to indicate between a polar code encoding mode and a Low-density Parity-check (LDPC) code encoding mode, and the encoding mode is an encoding mode used for encoding the first information,
wherein the indication information further comprises second indication information, and the second indication information is used to indicate the decoding mode associated with the encoding mode indicated by the first indication information, and the decoding mode associated with the encoding mode is used for decoding the first information,
wherein the indication information further comprises third indication information, and the third indication information is used to indicate configuration information corresponding to the decoding mode, and
wherein the decoding mode is determined among a plurality of decoding modes preset in the terminal device, and wherein the plurality of decoding modes preset in the terminal device comprise: a parity-check-aided successive cancellation list (PC-SCL) decoding mode, a cyclic redundancy check-aided successive cancellation list (CA-SCL) decoding mode, a layered normalized min-sum (LNMS) decoding mode, and a layered offset min-sum (LOMS) decoding mode.

* * * * *

UNITED STATES PATENT AND TRADEMARK OFFICE
CERTIFICATE OF CORRECTION

PATENT NO. : 11,523,328 B2  
APPLICATION NO. : 16/523684  
DATED : December 6, 2022  
INVENTOR(S) : Huang et al.

Page 1 of 1

It is certified that error appears in the above-identified patent and that said Letters Patent is hereby corrected as shown below:

On the Title Page

Item (56) Other Publications, Right-Hand Column, Line 2: "3GPPTSG RAN WG1 Meeting #87, Reno, USA, pp. 1-30, R1-1611256," should read -- 3GPP TSG RAN WG1 Meeting #87, Reno, USA, pp. 1-30, R1-1611256, --.

In the Claims

Claim 10: Column 20, Line 4: "is successive cancellation list width." should read -- is a successive cancellation list width. --.

Signed and Sealed this  
Ninth Day of May, 2023

Katherine Kelly Vidal  
*Director of the United States Patent and Trademark Office*